US012695817B2

(12) United States Patent
Bartolome Rodrigo et al.

(10) Patent No.: US 12,695,817 B2
(45) Date of Patent: Jul. 28, 2026

(54) PROXY-MEDIATED SERVICE REQUEST HANDLING BETWEEN NETWORK FUNCTIONS

(71) Applicant: Telefonaktiebolaget LM Ericsson (publ), Stockholm (SE)

(72) Inventors: Maria Cruz Bartolome Rodrigo, Torremocha de Jarama Madrid (ES); Magnus Hallenstål, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 169 days.

(21) Appl. No.: 18/017,744

(22) PCT Filed: Nov. 2, 2020

(86) PCT No.: PCT/EP2020/080691
§ 371 (c)(1),
(2) Date: Jan. 24, 2023

(87) PCT Pub. No.: WO2022/022843
PCT Pub. Date: Feb. 3, 2022

(65) Prior Publication Data
US 2023/0300215 A1 Sep. 21, 2023

(30) Foreign Application Priority Data
Jul. 31, 2020 (EP) .................................... 20382714

(51) Int. Cl.
*G06F 15/16* (2006.01)
*H04L 67/51* (2022.01)
*H04L 67/567* (2022.01)
(52) U.S. Cl.
CPC ............ *H04L 67/567* (2022.05); *H04L 67/51* (2022.05)

(58) Field of Classification Search
CPC ....... H04L 67/51; H04L 67/567; H04L 67/02; H04L 67/56; H04L 67/562; H04L 67/1004; H04L 63/0281; H04W 88/182
See application file for complete search history.

(56) References Cited

U.S. PATENT DOCUMENTS 8,930,513 B1 * 1/2015 Richardson ........... G06F 15/173
709/217
11,509,476 B2 * 11/2022 Choyi ................... H04L 67/563
(Continued)

FOREIGN PATENT DOCUMENTS

| | | |
|---|---|---|
| CN | 104104742 A | 10/2014 |
| CN | 110365796 A | 10/2019 |
| DE | 69526652 T2 | 6/2002 |

OTHER PUBLICATIONS

3GPP, "3GPP TS 23.501 V16.5.0", 3rd Generation Partnership Project; Technical Specification Group Services and System Aspects; System architecture for the 5G System (5GS); Stage 2 (Release 16), Jul. 2020, 1-441.

(Continued)

*Primary Examiner* — Suraj M Joshi
*Assistant Examiner* — Hao H Nguyen
(74) *Attorney, Agent, or Firm* — Murphy, Bilak & Homiller, PLLC

(57) ABSTRACT

There is provided a method handling a service request. The method is performed by a first service communication proxy (SCP) node that is configured to operate as an SCP between a first network function (NF) node of a service consumer and a second NF node of a service producer. If a first request, for the second NF node to use a resource to provide a first service requested by the first NF node, cannot be fulfilled, transmission of a second request is initiated (102) towards a third NF node of the service producer. In response to receiving a response to the second request, transmission of (Continued)

a response to the first request is initiated (104) towards the first NF node. The response comprises information indicative of a location of the resource in the third NF node to be used when a second service is subsequently requested by the first NF node.

21 Claims, 6 Drawing Sheets

(56) References Cited

U.S. PATENT DOCUMENTS

| | | | | |
|---|---|---|---|---|
| 11,622,276 | B1 * | 4/2023 | Wan | H04W 12/71 |
| | | | | 455/411 |
| 2002/0161745 | A1 * | 10/2002 | Call | A61L 2/10 |
| 2011/0199903 | A1 * | 8/2011 | Cuervo | H04M 15/00 |
| | | | | 370/328 |
| 2013/0346587 | A1 * | 12/2013 | Barkett | G06Q 10/40 |
| | | | | 709/224 |
| 2015/0012584 | A1 * | 1/2015 | Lo | H04L 67/563 |
| | | | | 709/203 |
| 2015/0019727 | A1 * | 1/2015 | Parakh | H04L 67/1004 |
| | | | | 709/225 |
| 2016/0308959 | A1 * | 10/2016 | Richardson | H04L 67/568 |
| 2019/0081942 | A1 * | 3/2019 | Suresh | H04L 67/1001 |
| 2020/0127916 | A1 * | 4/2020 | Krishan | H04L 45/121 |
| 2020/0336554 | A1 * | 10/2020 | Deshpande | H04L 67/1001 |
| 2021/0067480 | A1 * | 3/2021 | Goel | H04L 61/10 |
| 2021/0067485 | A1 * | 3/2021 | Goel | H04L 61/4511 |
| 2021/0112012 | A1 * | 4/2021 | Krishan | H04L 47/29 |
| 2021/0112443 | A1 * | 4/2021 | Krishan | H04L 12/1407 |
| 2021/0144217 | A1 * | 5/2021 | Liu | H04L 67/56 |
| 2021/0204200 | A1 * | 7/2021 | Krishan | H04W 4/50 |
| 2021/0250172 | A1 * | 8/2021 | Choyi | H04L 9/3239 |
| 2021/0297935 | A1 * | 9/2021 | Belling | H04W 40/00 |
| 2021/0306203 | A1 * | 9/2021 | Landais | H04L 67/02 |
| 2022/0052989 | A1 * | 2/2022 | Zhao | H04L 63/0807 |
| 2023/0019000 | A1 * | 1/2023 | Li | H04W 12/084 |
| 2023/0188625 | A1 * | 6/2023 | Rodrigo | H04L 67/63 |
| | | | | 709/238 |
| 2023/0224782 | A1 * | 7/2023 | Landais | H04W 36/14 |
| | | | | 370/331 |
| 2023/0254381 | A1 * | 8/2023 | Rodrigo | H04L 67/51 |
| | | | | 709/224 |
| 2023/0262459 | A1 * | 8/2023 | Li | H04W 12/069 |
| | | | | 455/410 |
| 2023/0291809 | A1 * | 9/2023 | Lu | H04L 67/563 |

OTHER PUBLICATIONS

3GPP, "3GPP TS 29.500 V16.4.0", 3rd Generation Partnership Project; Technical Specification Group Core Network and Terminals; 5G System; Technical Realization of Service Based Architecture; Stage 3 (Release 16), 2020-06, 1-79.

3GPP, "3GPP TS 29.501 V16.3.0", 3rd Generation Partnership Project; Technical Specification Group Core Network and Terminals; 5G System; Principles and Guidelines for Services Definition; Stage 3 (Release 16), Mar. 2020, 1-70.

3GPP, "3GPP TS 29.501 V16.4.0", 3rd Generation Partnership Project; Technical Specification Group Core Network and Terminals; 5G System; Principles and Guidelines for Services Definition; Stage 3 (Release 16), 2020-06, 1-73.

3GPP, "3GPP TS 29.502 V16.3.0", 3rd Generation Partnership Project; Technical Specification Group Core Network and Terminals; 5G System; Session Management Services; Stage 3 (Release 16), Mar. 2020, 1-236.

3GPP, "3GPP TS 29.510 V16.3.0", 3rd Generation Partnership Project; Technical Specification Group Core Network and Terminals; 5G System; Network Function Repository Services; Stage 3 (Release 16), Mar. 2020, 1-172.

3GPP, "3rd Generation Partnership Project; Technical Specification Group Services and System Aspects; System architecture for the 5G System (5GS); Stage 2 (Release 16)", 3GPP TS 23.501 V16.4.0, Mar. 2020, 1-430.

Pillai, Sarath, "Difference Between Iterative and Recursive DNS Query", <http://www.slashroot.in/difference-between-iterative-and-recursive-dns-query> accessed Apr. 20, 2016, Jan. 12, 2013, 1-19.

Ericsson, "Failover cause", 3GPP TSG-CT WG4 Meeting #96e, C4-201095, (was C4-200404), E-Meeting, Feb. 17-28, 2020, 1-7.

Huawei, "Discussion paper on Discussion paper on Binding Indication", 3GPP TSG-CT WG4 Meeting #93, C4-193500, Revision of C4-193368, Wroclaw, Poland, Aug. 26-30, 2019, 1-3.

Nokia, et al., "Discussion paper on authorization for Model D Indirect communications", 3GPP TSG SA WG3 (Security) Meeting #97, S3-194380, revision of S3-19xabc, Reno, USA, Nov. 18-22, 2019, 1-6.

Orange, "Pseudo-CR on Discovery of the supported versions using GET", 3GPP TSG CT WG4 Meeting #85, C4-184317, Osaka, Japan, May 21-25, 2018, 1-2.

* cited by examiner

Receive a response to a first request, wherein
the response comprises information indicative
of a location of the resource in a third NF node
to be used when a second service is
subsequently requested by the first NF node

202

PROXY-MEDIATED SERVICE REQUEST HANDLING BETWEEN NETWORK FUNCTIONS

TECHNICAL FIELD

The disclosure relates to methods for handling a service request in a network and nodes configured to operate in accordance with those methods.

BACKGROUND

There exist various techniques for handling a request for a service in a network. A service request is generally from a consumer of the service ("service consumer") to a producer of the service ("service producer"). For example, a service request may be from a network function (NF) node of a service consumer to an NF node of a service producer. The NF node of the service consumer and the NF node of the service producer can communicate directly or indirectly. This is referred to as direct communication and indirect communication respectively. In the case of indirect communication, the NF node of the service consumer and the NF node of the service producer may communicate via a service communication proxy (SCP) node.

FIG. 1A-D illustrates different existing systems for handling service requests, as set out in 3GPP TS 23.501 V16.4.0. In more detail, FIGS. 1A and 1B illustrates a system that uses direct communication, while FIGS. 1C and 1D illustrates a system that uses indirect communication.

In the systems illustrated in FIGS. 1A and 1B, a service request is sent directly from the NF node of the service consumer to the NF node of the service producer. A response to the service request is sent directly from the NF node of the service producer to the NF node of the service consumer. Similarly, any subsequent service requests are sent directly from the NF node of the service consumer to the NF node of the service producer. The system illustrated in FIG. 1B also comprises a network repository function (NRF). Thus, in the system illustrated in FIG. 1B, the NF node of the consumer can query the NRF to discover suitable NF nodes of the service producer to which to send the service request. In response to such a query, the NF node of the consumer can receive an NF profile for one or more NF nodes of the service producer and, based on the received NF profile(s) can select an NF node of the service producer to which to send the service request. In the system illustrated in FIG. 1A, the NRF is not used and instead the NF node of the consumer may be configured with the NF profile(s) of the NF node(s) of the service producer.

In the systems illustrated in FIGS. 1C and 1D, a service request is sent indirectly from the NF node of the service consumer to the NF node of the service producer via a service communication proxy (SCP) node. A response to the service request is sent indirectly from the NF node of the service producer to the NF node of the service consumer via the SCP. Similarly, any subsequent service requests are sent indirectly from the NF node of the service consumer to the NF node of the service producer via the SCP. The systems illustrated in FIGS. 1C and D also comprise an NRF.

In the system illustrated in FIG. 1C, the NF node of the consumer can query the NRF to discover suitable NF nodes of the service producer to which to send the service request. In response to such a query, the NF node of the consumer can receive an NF profile for one or more NF nodes of the service producer and, based on the received NF profile(s) can select an NF node of the service producer to which to send the service request. In this case, the service request sent from the NF node of the service consumer to the SCP comprises the address of the selected NF node of the service producer. The NF node of the service consumer can forward the service request without performing any further discovery or selection. In case the selected NF node of the service producer is not accessible for any reason, it may be up to the NF node of the service consumer to find an alternative. In other cases, the SCP may communicate with the NRF to acquire selection parameters (e.g. location, capacity, etc.) and the SCP may select an NF node of the service producer to which to send the service request.

In the system illustrated in FIG. 1D, the NF node of the consumer does not carry out the discovery or selection process. Instead, the NF node of the consumer adds any necessary discovery and selection parameters (required to find a suitable NF node of the service producer) to the service request that it sends via the SCP. The SCP uses the request address and the discovery and selection parameters in the service request to route the service request to a suitable NF node of the service producer. The SCP can perform discovery with the NRF.

For the fifth generation core (5GC), from Release 16, the SCP is included as a network element to allow indirect communication between an NF node of a service consumer and an NF node of a service producer. The indirect communication that is used can be either of the two indirect communications options described earlier with reference to FIGS. 1C and 1D.

FIG. 2 is a signalling diagram illustrating an exchange of signals in an existing system, such as the system illustrated in FIG. 1C but it will be understood the issue described can also apply to the system illustrated in FIG. 1D. The system illustrated in FIG. 2 comprises a first SCP node 10, a first NF node 20 of a service consumer ("NFc"), a second NF node 30 of a service producer ("NFp1"), and a third NF node 70 of a service producer ("NFp2"). The first SCP node 10 is configured to operate as an SCP between the first NF node 20 and the second NF node 30. The second NF node 30 can be configured to run a service ("servA-1") and the third NF node 70 can be configured to run a service ("servA-2"). The second NF node 30 and the third NF node 70 can be part of a set 402 of NF nodes of a service producer. Although not illustrated, the system illustrated in FIG. 2 can also comprise a network repository function node.

In FIG. 2, step 600 relates to the establishment of a session between the first NF node 20 and the second NF node 30. Once a session is established, the method illustrated by steps 602-618 is performed. As illustrated by arrows 602 and 604 of FIG. 2, the first NF node 20 initiates transmission of first request 602, 604 towards the second NF node via the first SCP node 10. The first request 602, 604 is for the second NF node 30 to use a resource to provide a first service requested by the first NF node 20. The first request 602, 604 comprises an address of the second NF node 30, which may be an application programming interface (API) root of a uniform resource identifier (URI) used to reach of the second NF node 30 (i.e. the sbi-target-apiroot). The first request 602, 604 also comprises an identifier that (e.g. uniquely) identifies the second NF node 30, such as a fully qualified domain name (FQDN) for the second NF node 30.

There is a break in the first service at the second NF node 30. As a result, as illustrated at block 606, the first SCP node 10 receives no response from the second NF node 30 to the first request 602, 604 or, alternatively, the first SCP node 10 may receive an error response (e.g. a 5xx code) from the second NF node 30. As illustrated by block 608 of FIG. 2, the first SCP node 10 identifies that a reselection is required. That is, the first SCP node 10 identifies that a different NF node of the service producer needs to be selected. As illustrated by arrow 610 of FIG. 2, the first SCP node 10 then has to initiate transmission of an error response (e.g. a 308 Permanent Redirect) towards the first NF node 20. The error response comprises information indicative of the location of the second NF node 30 and an identifier that (e.g. uniquely) identifies the second NF node 30, such as a FQDN for the second NF node 30. The error response informs the first NF node 20 that there is an error situation and thus the first service cannot be provided.

In response to the error response, the first NF node 20 may select another NF node of the service producer. The first NF node 20 can, in principle, select any NF node where the resource is located. For the purpose of the illustration, it is assumed that the first NF node 20 selects the third NF node 70. As illustrated by arrows 612 and 614 of FIG. 2, the first NF node 20 initiates transmission of a second request towards the third NF node 70 via the first SCP node 10. The second request 612, 614 is for the third NF node 70 to use the resource to provide the first service requested by the first NF node 20. The second request 612, 614 comprises an address of the third NF node 70, which may be an application programming interface (API) root of a uniform resource identifier (URI) used to reach of the third NF node 70 (i.e. the sbi-target-apiroot). The second request 612, 614 also comprises an identifier that (e.g. uniquely) identifies the third NF node 70, such as an FQDN for the third NF node 70. As illustrated by arrows 616 and 618 of FIG. 2, the third NF node initiates transmission of a response towards the first NF node 20 via the first SCP node 10.

A problem arises when the first SCP node 10 performs reselection in the manner described with reference to FIG. 2. Following a reselection, the first SCP node 10 is supposed to continue to use the same instance of the service. The only hypertext transfer protocol (HTTP) responses that can specify that an address of the third NF node 70 may be present are 201 and 3xx (e.g. 308 Permanent Redirect) responses. Of these response, only the 3xx responses can be used in a reselection. However, if the first SCP node 10 uses such a response, it means that the extra round trip illustrated by steps 610 and 612 must be performed, where the first SCP node 10 sends a redirect to the first NF node 20 and the first NF node 20 is required to initiate transmission of a new request. This can be inefficient and inconvenient. Furthermore, redirection may not even be supported by all NF service consumer nodes.

The Article; "difference between iterative and recursive DNS queries" by Sarath Pillai is another non 3GPP example suffering the same problem. Here a browser requires a web page but has not the required IP address of the server where the web page is stored. The browser request the IP address from its local DNS server. The local DNS server recursively requests via a DNS root server, a TLD server to get finally to DNS server that can provide the IP address. If the Browser does not store locally the web page address a subsequent request for the same will follow the same procedure which is far from efficient.

Currently, the way to avoid redirection is for the first SCP node 10 to store the newly selected resource for each and every user equipment (UE)/session. However, requiring the first SCP node 10 to store such information increases the complexity of the first SCP node 10 and also uses up valuable storage resources, which is undesirable and best avoided.

SUMMARY

It is an object of the disclosure to obviate or eliminate at least some of the above-described disadvantages associated with existing techniques.

Therefore, according to an aspect of the disclosure, there is provided a method for handling a service request in a network. The method is performed by a first service communication proxy (SCP) node that is configured to operate as an SCP between a first network function (NF) node of a service consumer and a second NF node of a service producer in the network. The method is performed if a first request, for the second NF node to use a resource to provide a first service requested by the first NF node, cannot be fulfilled. The method comprises initiating transmission of a second request towards a third NF node of the service producer. The second request is for the third NF node to use the resource to provide the first service requested by the first NF node. The method comprises, in response to receiving a response to the second request indicative that the second request is successful, initiating transmission of a response to the first request towards the first NF node. The response to the first request comprises information indicative of a location of the resource in the third NF node to be used when a second service is subsequently requested by the first NF node.

In some embodiments, the information may comprise any one or more of an address of the third NF node, a name of the service producer, a version of an application programming interface (API) for the service producer, an identifier that identifies the resource, and an address of the resource.

In some embodiments, the information may be a uniform resource identifier (URI).

In some embodiments, a header of the response to the first request may comprise the information.

In some embodiments, the header may be a custom header.

In some embodiments, the header may be a hypertext transfer protocol (HTTP) or HTTP/2 header.

In some embodiments, the first service and the second service may be different instances of the same service.

In some embodiments, the different instances of the same service may be of the same type of service.

In some embodiments, a set of services may comprise the first service and the second service.

In some embodiments, the third NF node and the second NF node may be the same NF node, or the third NF node and the second NF node may be different NF nodes.

In some embodiments, the third NF node and the second NF node may be different NF nodes, and a set of NF nodes may comprise the second NF node and the third NF node.

In some embodiments, the method may comprise selecting the third NF node to provide the first service.

In some embodiments, initiating transmission of the second request towards the third NF node may be performed multiple times in respect of at least one third NF node until receipt of the response indicative that the second request is successful and the information may be indicative of the location of the resource in the third NF node in respect of which the second request is successful.

In some embodiments, the at least one third NF node may be a single third NF node or a plurality of different third NF nodes.

In some embodiments, the method may comprise generating the response to the first request, wherein generating the response to the first request may comprise replacing information present in the first request that is indicative of a location of the resource in the second NF node with the information indicative of a location of the resource in the third NF node.

In some embodiments, it may be that the first request cannot be fulfilled if the first request transmitted towards the second NF node is unsuccessful, no response is received from the second NF node to the first request transmitted towards the second NF node, or transmission of the first request towards the second NF node is prevented.

In some embodiments, the first SCP node and the first NF node may be deployed in independent deployment units, the first SCP node and the second NF node may be deployed in independent deployment units, and/or the first SCP node and the third NF node may be deployed in independent deployment units.

In some embodiments, the first SCP node may be deployed as a distributed network element.

In some embodiments, part of the first SCP node may be deployed in the same deployment unit as the first NF node, part of the first SCP node may be deployed in the same deployment unit as the second NF node, and/or part of the first SCP node may be deployed in the same deployment unit as the third NF node.

In some embodiments, at least one second SCP node may be configured to operate as an SCP between the first NF node and the first SCP node, at least one third SCP node may be configured to operate as an SCP between the first SCP node and the second NF node, and/or at least one fourth SCP node may be configured to operate as an SCP between the first SCP node and the third NF node.

In some embodiments, the first SCP node and one or more of the at least one second SCP node, the at least one third SCP node, and the at least one fourth SCP node may be deployed in independent deployment units.

In some embodiments, the at least one second SCP node, the at least one third SCP node, and/or the at least one fourth SCP node may be deployed as distributed network elements.

In some embodiments, an entity may comprise the first SCP node and a network repository function (NRF) node.

According to another aspect of the disclosure, there is provided a first SCP node comprising processing circuitry (12) configured to operate in accordance with the method described earlier in respect of the first SCP node.

In some embodiments, the first SCP node may comprise at least one memory for storing instructions which, when executed by the processing circuitry, cause the first SCP node to operate in accordance with the method described earlier in respect of the first SCP node.

According to another aspect of the disclosure, there is provided a method for handling a service request in a network. The method is performed by a first network function (NF) node of a service consumer and wherein a first service communication proxy (SCP) node is configured to operate as an SCP between the first NF node and a second NF node of a service producer in the network. The method comprises receiving a response to a first request. The first request is for the second NF node to use a resource to provide a first service requested by the first NF node. The response comprises information indicative of a location of the resource in a third NF node to be used when a second service is subsequently requested by the first NF node.

In some embodiments, the method may comprise controlling a memory to store the information indicative of a location of the resource in a third NF node in place of previously stored information indicative of a location of the resource in the second NF node.

In some embodiments, the information may comprise any one or more of an address of the third NF node, a name of the service producer, a version of an application programming interface (API) for the service producer, an identifier that identifies the resource, and an address of the resource.

In some embodiments, the information may be a uniform resource identifier (URI).

In some embodiments, a header of the response to the first request may comprise the information.

In some embodiments, the header may be a custom header.

In some embodiments, the header may be a hypertext transfer protocol (HTTP) or HTTP/2 header.

In some embodiments, the first service and the second service may be different instances of the same service.

In some embodiments, the different instances of the same service may be of the same type of service.

In some embodiments, a set of services may comprise the first service and the second service.

In some embodiments, the third NF node and the second NF node may be the same NF node, or the third NF node and the second NF node may be different NF nodes.

In some embodiments, the third NF node and the second NF node may be different NF nodes, and a set of NF nodes may comprise the second NF node and the third NF node.

In some embodiments, the first SCP node and the first NF node may be deployed in independent deployment units, the first SCP node and the second NF node may be deployed in independent deployment units, and/or the first SCP node and the third NF node may be deployed in independent deployment units.

In some embodiments, the first SCP node may be deployed as a distributed network element.

In some embodiments, part of the first SCP node may be deployed in the same deployment unit as the first NF node, part of the first SCP node may be deployed in the same deployment unit as the second NF node, and/or part of the first SCP node may be deployed in the same deployment unit as the third NF node.

In some embodiments, at least one second SCP node may be configured to operate as an SCP between the first NF node and the first SCP node, at least one third SCP node may be configured to operate as an SCP between the first SCP node and the second NF node, and/or at least one fourth SCP node may be configured to operate as an SCP between the first SCP node and the third NF node.

In some embodiments, the first SCP node and one or more of the at least one second SCP node, the at least one third SCP node, and the at least one fourth SCP node may be deployed in independent deployment units.

In some embodiments, the at least one second SCP node, the at least one third SCP node, and/or the at least one fourth SCP node may be deployed as distributed network elements.

In some embodiments, an entity may comprise the first SCP node and a network repository function (NRF) node.

According to another aspect of the disclosure, there is provided a first NF node comprising processing circuitry configured to operate in accordance with the method described earlier in respect of the first NF node.

In some embodiments, the first NF node may comprise at least one memory for storing instructions which, when executed by the processing circuitry, cause the first NF node to operate in accordance with the method described earlier in respect of the first NF node.

According to another aspect of the disclosure, there is provided a method performed by a system. The method comprises the method as described earlier in respect of the first SCP node and/or the method described earlier in respect of the first NF node.

According to another aspect of the disclosure, there is provided a system comprising at least one first SCP node as described earlier and/or at least one first NF node as described earlier.

According to another aspect of the disclosure, there is provided a computer program comprising instructions which, when executed by processing circuitry, cause the processing circuitry to perform the method as described earlier in respect of the first SCP node and/or the first NF node.

According to another aspect of the disclosure, there is provided a computer program product, embodied on a non-transitory machine-readable medium, comprising instructions which are executable by processing circuitry to cause the processing circuitry to perform the method as described earlier in respect of the first SCP node and/or the first NF node.

Thus, an improved technique for handling service requests in a network is provided.

BRIEF DESCRIPTION OF THE DRAWINGS

For a better understanding of the technique, and to show how it may be put into effect, reference will now be made, by way of example, to the accompanying drawings, in which.

DETAILED DESCRIPTION

Herein, techniques for handling a service request in a network are described. A service request can also be referred to as a request for a service. Generally, a service is software intended to be managed for users. Herein, a service can be any type of service, such as a communication service a context management (e.g. user equipment context management (UECM)) service, a data management (DM) service, or any other type of service. The techniques described herein can be used in respect of any network, such as any communications network. The network may be a fifth generation (5G) network or any other generation network. In some embodiments, the network may be a core network or a radio access network (RAN). The techniques are implemented by a first service communication proxy (SCP) node and a first network function (NF) node.

An NF is a third generation partnership project (3GPP) adopted or 3GPP defined processing function in a network, which has defined functional behaviour and 3GPP defined interfaces. An NF can be implemented either as a network element on a dedicated hardware, as a software instance running on a dedicated hardware, or as a virtualised function instantiated on an appropriate platform, e.g. on a cloud infrastructure. Herein, the term "node" in relation to an "NF node" will be understood to cover each of these scenarios.

Figure 3:
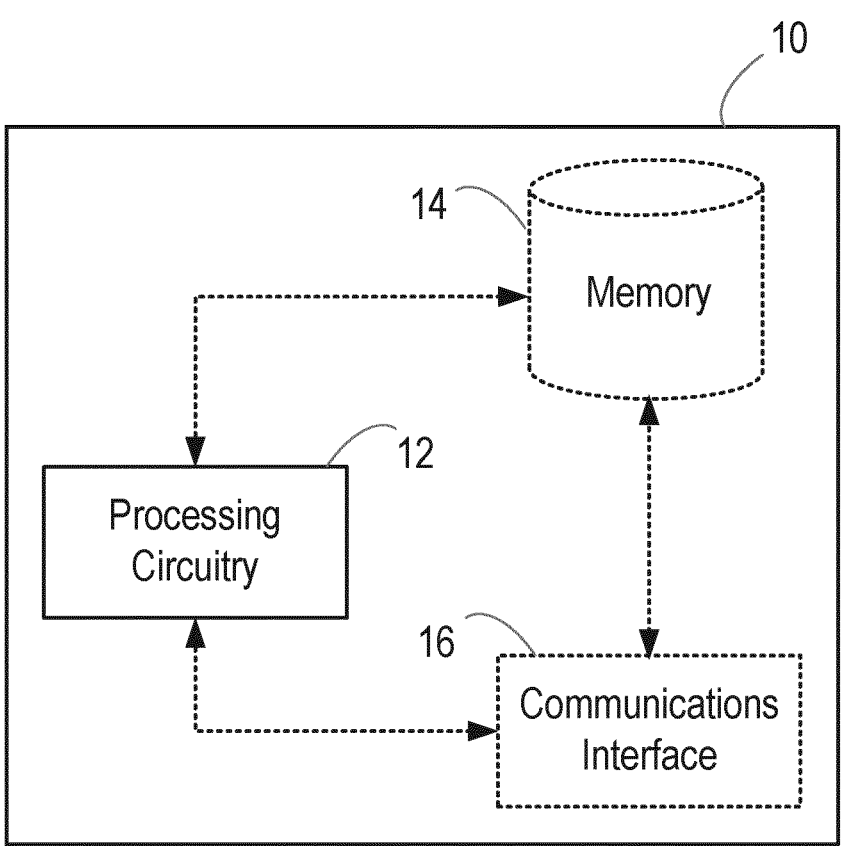
FIG. 3 is a block diagram illustrating a first service communication proxy (SCP) node according to an embodiment.

FIG. 3 illustrates a first SCP node 10 in accordance with an embodiment. The first SCP node 10 is for handling a service request in a network. The first SCP node 10 is configured to operate as an SCP between the first NF node 20 of the service consumer and the second NF node of the service producer in the network. In some embodiments, the first SCP node 10 can be, for example, be a physical machine (e.g. a server) or a virtual machine (VM).

As illustrated in FIG. 3, the first SCP node 10 comprises processing circuitry (or logic) 12. The processing circuitry 12 controls the operation of the first SCP node 10 and can implement the method described herein in respect of the first SCP node 10. The processing circuitry 12 can be configured or programmed to control the first SCP node 10 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the first SCP node 10. In some embodiments, the processing circuitry 12 can be configured to run software to perform the method described herein in respect of the first SCP node 10. The software may be containerized according to some embodiments. Thus, in some embodiments, the processing circuitry 12 may be configured to run a container to perform the method described herein in respect of the first SCP node 10.

Briefly, the processing circuitry 12 of the first SCP node 10 is configured to operate if a first request, for the second NF node to use a resource to provide a first service requested by the first NF node, cannot be fulfilled. Specifically, the processing circuitry 12 of the first SCP node 10 is configured to initiate transmission of a second request towards a third NF node of the service producer. The second request is for the third NF node to use the resource to provide the first service requested by the first NF node. The processing circuitry 12 of the first SCP node 10 is configured to, in response to receiving a response to the second request indicative that the second request is successful, initiate transmission of a response to the first request towards the first NF node. The response to the first request comprises information indicative of a location of the resource in the third NF node to be used when a second service is subsequently requested by the first NF node.

As illustrated in FIG. 3, in some embodiments, the first SCP node 10 may optionally comprise a memory 14. The memory 14 of the first SCP node 10 can comprise a volatile memory or a non-volatile memory. In some embodiments, the memory 14 of the first SCP node 10 may comprise a non-transitory media. Examples of the memory 14 of the first SCP node 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the first SCP node 10 can be connected to the memory 14 of the first SCP node 10. In some embodiments, the memory 14 of the first SCP node 10 may be for storing program code or instructions which, when executed by the processing circuitry 12 of the first SCP node 10, cause the first SCP node 10 to operate in the manner described herein in respect of the first SCP node 10. For example, in some embodiments, the memory 14 of the first SCP node 10 may be configured to store program code or instructions that can be executed by the processing circuitry 12 of the first SCP node 10 to cause the first SCP node 10 to operate in accordance with the method described herein in respect of the first SCP node 10. Alternatively or in addition, the memory 14 of the first SCP node 10 can be configured to store any information, data, messages, requests, responses, indications, notifications, signals, or similar, that are described herein. The processing circuitry 12 of the first SCP node 10 may be configured to control the memory 14 of the first SCP node 10 to store information, data, messages, requests, responses, indications, notifications, signals, or similar, that are described herein.

In some embodiments, as illustrated in FIG. 3, the first SCP node 10 may optionally comprise a communications interface 16. The communications interface 16 of the first SCP node 10 can be connected to the processing circuitry 12 of the first SCP node 10 and/or the memory 14 of first SCP node 10. The communications interface 16 of the first SCP node 10 may be operable to allow the processing circuitry 12 of the first SCP node 10 to communicate with the memory 14 of the first SCP node 10 and/or vice versa. Similarly, the communications interface 16 of the first SCP node 10 may be operable to allow the processing circuitry 12 of the first SCP node 10 to communicate with the first NF node and/or any other node. The communications interface 16 of the first SCP node 10 can be configured to transmit and/or receive information, data, messages, requests, responses, indications, notifications, signals, or similar, that are described herein. In some embodiments, the processing circuitry 12 of the first SCP node 10 may be configured to control the communications interface 16 of the first SCP node 10 to transmit and/or receive information, data, messages, requests, responses, indications, notifications, signals, or similar, that are described herein.

Although the first SCP node 10 is illustrated in FIG. 3 as comprising a single memory 14, it will be appreciated that the first SCP node 10 may comprise at least one memory (i.e. a single memory or a plurality of memories) 14 that operate in the manner described herein. Similarly, although the first SCP node 10 is illustrated in FIG. 3 as comprising a single communications interface 16, it will be appreciated that the first SCP node 10 may comprise at least one communications interface (i.e. a single communications interface or a plurality of communications interface) 16 that operate in the manner described herein. It will also be appreciated that FIG. 3 only shows the components required to illustrate an embodiment of the first SCP node 10 and, in practical implementations, the first SCP node 10 may comprise additional or alternative components to those shown.

Figure 4:
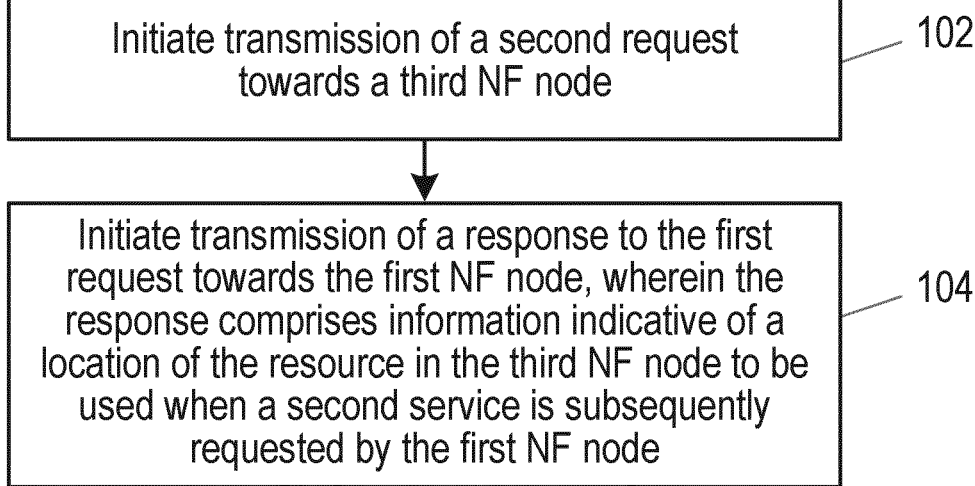
FIG. 4 is a flowchart illustrating a method performed by a first SCP node according to an embodiment.

FIG. 4 is a flowchart illustrating a method performed by a first SCP node 10 in accordance with an embodiment. The first SCP node 10 is configured to operate as an SCP between the first NF node 20 of the service consumer and the second NF node of the service producer in the network. The method is for handling a service request in the network. The first SCP node 10 described earlier with reference to FIG. 3 is configured to operate in accordance with the method of FIG. 4. The method can be performed by or under the control of the processing circuitry 12 of the first SCP node 10. The method is performed if a first request, for the second NF node to use a resource to provide a first service requested by the first NF node, cannot be fulfilled.

As illustrated at block 102 of FIG. 4, transmission of a second request is initiated towards a third NF node of the service producer. The second request is for the third NF node to use the resource to provide the first service requested by the first NF node.

As illustrated at block 104 of FIG. 4, in response to receiving a response to the second request indicative that the second request is successful, transmission of a response to the first request is initiated towards the first NF node. The response to the first request comprises information indicative of a location of the resource in the third NF node to be used when a second service is subsequently requested by the first NF node.

Herein, the term "initiate" can mean, for example, cause or establish. Thus, the processing circuitry 12 of the first SCP node 10 can be configured to itself transmit the second request and/or the response to the first request (e.g. via a communications interface 16 of the first SCP node 10) or can be configured to cause another node to transmit the second request and/or the response to the first request. Herein, the term resource will be understood to mean either an individual resource or a plurality of resources, e.g. structured resources, which may contain child resources.

Figures 5, 6:
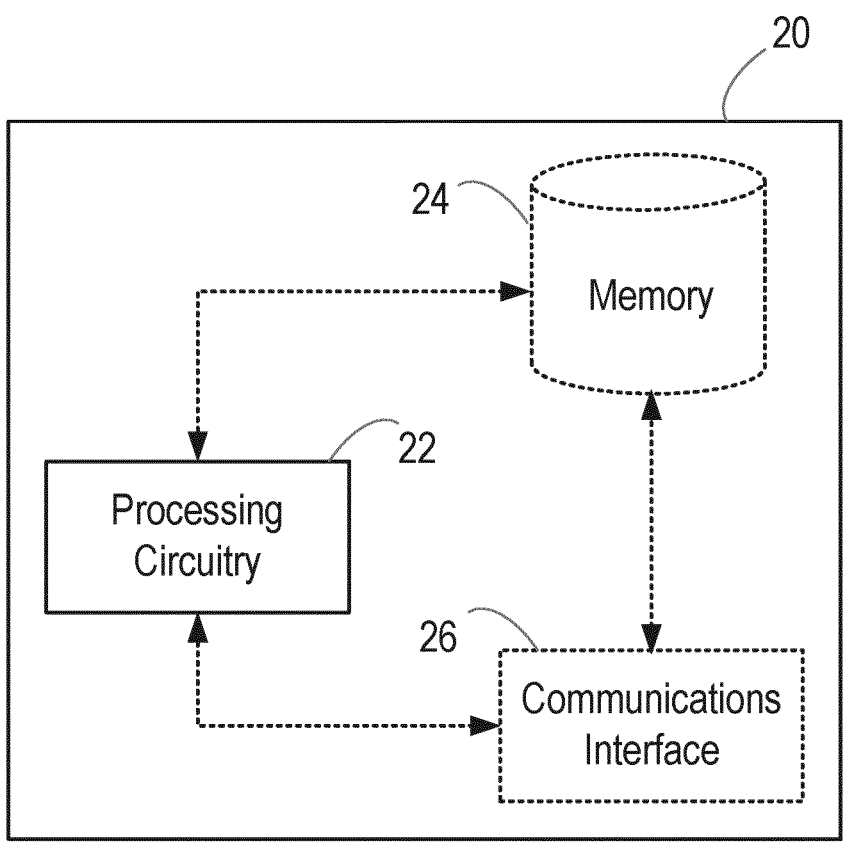
FIG. 5 is a block diagram illustrating a first network function (NF) node according to an embodiment.
FIG. 6 is a flowchart illustrating a method performed by a first NF node according to an embodiment.

FIG. 5 illustrates a first NF node 20 of a service consumer in accordance with an embodiment. The first NF node 20 is for handling a service request in a network. A first SCP node 10 is configured to operate as an SCP between the first NF node and a second NF node of a service producer in the network. In some embodiments, the first NF node 20 can be, for example, be a physical machine (e.g. a server) or a virtual machine (VM). The first NF node 20 can be, for example, a user equipment (UE).

As illustrated in FIG. 5, the first NF node 20 comprises processing circuitry (or logic) 22. The processing circuitry 22 controls the operation of the first NF node 20 and can implement the method described herein in respect of the first NF node 20. The processing circuitry 22 can be configured or programmed to control the first NF node 20 in the manner described herein. The processing circuitry 22 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the first NF node 20. In some embodiments, the processing circuitry 22 can be configured to run software to perform the method described herein in respect of the first NF node 20. The software may be containerized according to some embodiments. Thus, in some embodiments, the processing circuitry 22 may be configured to run a container to perform the method described herein in respect of the first NF node 20.

Briefly, the processing circuitry 22 of the first NF node 20 is configured to receive a response to a first request. The first request is for the second NF node to use a resource to provide a first service requested by the first NF node. The response comprises information indicative of a location of the resource in a third NF node to be used when a second service is subsequently requested by the first NF node.

As illustrated in FIG. 5, in some embodiments, the first NF node 20 may optionally comprise a memory 24. The memory 24 of the first NF node 20 can comprise a volatile memory or a non-volatile memory. In some embodiments, the memory 24 of the first NF node 20 may comprise a non-transitory media. Examples of the memory 24 of the first NF node 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the first NF node 20 can be connected to the memory 24 of the first NF node 20. In some embodiments, the memory 24 of the first NF node 20 may be for storing program code or instructions which, when executed by the processing circuitry 22 of the first NF node 20, cause the first NF node 20 to operate in the manner described herein in respect of the first NF node 20. For example, in some embodiments, the memory 24 of the first NF node 20 may be configured to store program code or instructions that can be executed by the processing circuitry 22 of the first NF node 20 to cause the first NF node 20 to operate in accordance with the method described herein in respect of the first NF node 20. Alternatively or in addition, the memory 24 of the first NF node 20 can be configured to store any information, data, messages, requests, responses, indications, notifications, signals, or similar, that are described herein. The processing circuitry 22 of the first NF node 20 may be configured to control the memory 24 of the first NF node 20 to store information, data, messages, requests, responses, indications, notifications, signals, or similar, that are described herein.

In some embodiments, as illustrated in FIG. 5, the first NF node 20 may optionally comprise a communications interface 26. The communications interface 26 of the first NF node 20 can be connected to the processing circuitry 22 of the first NF node 20 and/or the memory 24 of first NF node 20. The communications interface 26 of the first NF node 20 may be operable to allow the processing circuitry 22 of the first NF node 20 to communicate with the memory 24 of the first NF node 20 and/or vice versa. Similarly, the communications interface 26 of the first NF node 20 may be operable to allow the processing circuitry 22 of the first NF node 20 to communicate with the first SCP node 10 and/or any other node. The communications interface 26 of the first NF node 20 can be configured to transmit and/or receive information, data, messages, requests, responses, indications, notifications, signals, or similar, that are described herein. In some embodiments, the processing circuitry 22 of the first NF node 20 may be configured to control the communications interface 26 of the first NF node 20 to transmit and/or receive information, data, messages, requests, responses, indications, notifications, signals, or similar, that are described herein.

Although the first NF node 20 is illustrated in FIG. 5 as comprising a single memory 24, it will be appreciated that the first NF node 20 may comprise at least one memory (i.e. a single memory or a plurality of memories) 24 that operate in the manner described herein. Similarly, although the first NF node 20 is illustrated in FIG. 5 as comprising a single communications interface 26, it will be appreciated that the first NF node 20 may comprise at least one communications interface (i.e. a single communications interface or a plurality of communications interface) 26 that operate in the manner described herein. It will also be appreciated that FIG. 5 only shows the components required to illustrate an embodiment of the first NF node 20 and, in practical implementations of the first NF node 20 may comprise additional or alternative components to those shown.

FIG. 6 is a flowchart illustrating a method performed by a first NF node 20 in accordance with an embodiment. The method of FIG. 6 is for handling a service request in the network. The first NF node 20 described earlier with reference to FIG. 5 is configured to operate in accordance with the method of FIG. 6. The method can be performed by or under the control of the processing circuitry 22 of the first NF node 20. A first SCP node 10 is configured to operate as an SCP between the first NF node 20 and a second NF node of a service producer in the network.

As illustrated at block 202 of FIG. 6, a response to a first request is received. The first request is for the second NF node to use a resource to provide a first service requested by the first NF node. The response comprises information indicative of a location of the resource in a third NF node to be used when a second service is subsequently requested by the first NF node.

There is also provided a system. The system can comprise at least one first SCP node 10 as described herein and/or at least one first NF node 20 as described herein. The system may also comprise any one or more of the other nodes mentioned herein.

Figure 7:
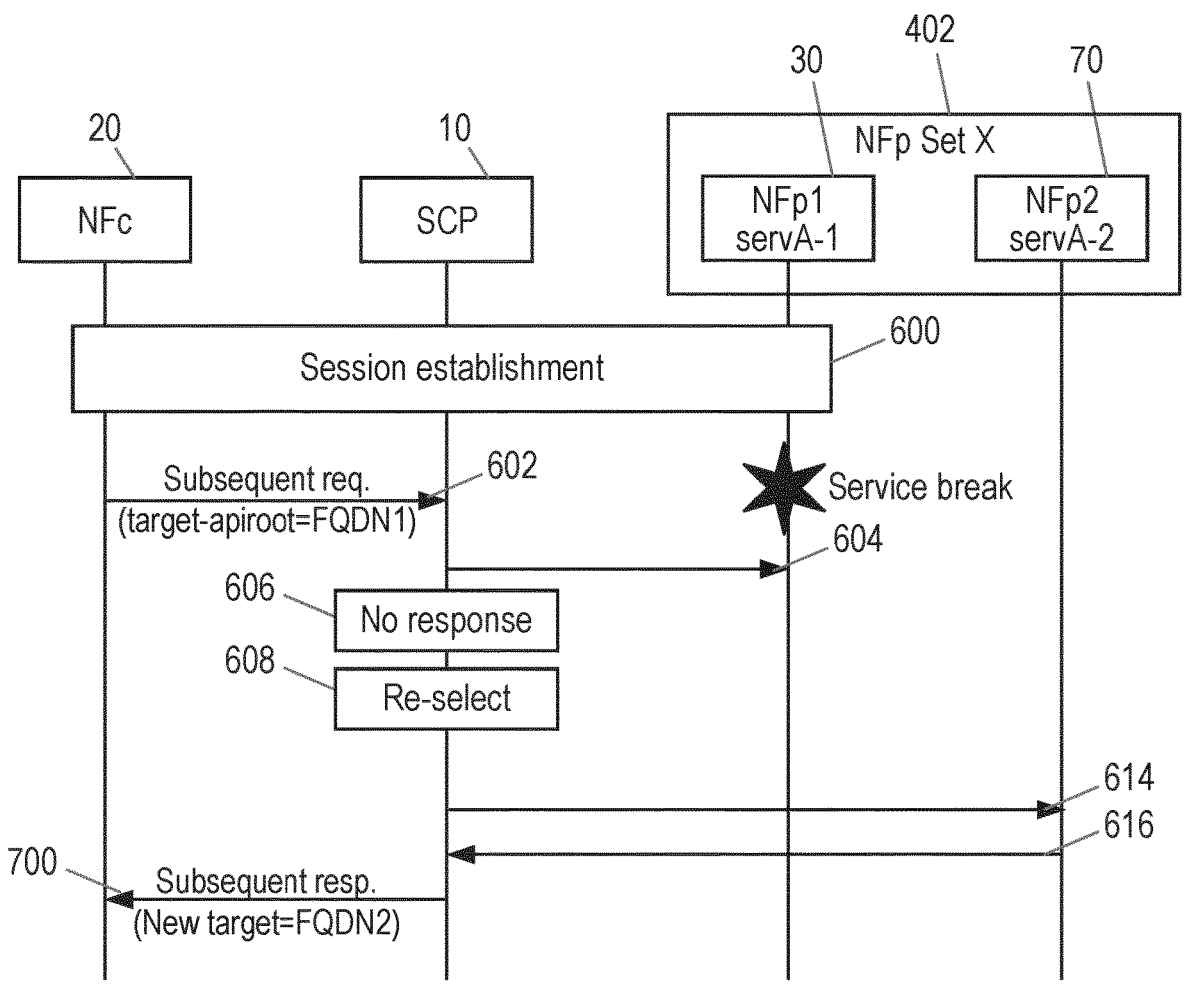
FIG. 7 is a signalling diagram illustrating an exchange of signals in a system according to an embodiment.

FIG. 7 is a signalling diagram illustrating an exchange of signals in a system according to an embodiment. The system illustrated in FIG. 7 comprises a first SCP node 10 and a first NF node 20 of a service consumer ("NFc"). The first SCP node 10 can be as described earlier with reference to FIGS. 3 and 4. The first NF node 20 can be as described earlier with reference to FIGS. 5 and 6.

The system illustrated in FIG. 7 comprises a second NF node 30 of a service producer ("NFp1") and a third NF node 70 of a service producer ("NFp2"). The first SCP node 10 is configured to operate as an SCP between the first NF node 20 and the second NF node 30. The first SCP node 10 is also configured to operate as an SCP between the first NF node 20 and the third NF node 70. The second NF node 30 can be configured to run a service ("servA-1"). The third NF node 70 can be configured to run a service ("servA-2"). The second NF node 30 and the third NF node 70 can be configured to run the same service (e.g. different instances of the same service) and/or a different service.

The second NF node 30 and the third NF node 70 can be part of a set 402 of NF nodes of a service producer, i.e. they can be part of an "NF Set". An NF Set can be a group of interchangeable NF nodes. The NF nodes of an NF Set can be NF nodes of the same type. The NF nodes of an NF set may support the same services and/or may support the same network slice(s). In some embodiments, the NF nodes in the same NF Set may be geographically distributed. The NF nodes in the same NF Set can have access to the same data (e.g. the same context data).

Although not illustrated, in some embodiments, the system illustrated in FIG. 7 may comprise a network repository function (NRF) node. In some embodiments, an entity may comprise the first SCP node 10 and the NRF node. That is, in some embodiments, the first SCP node 10 can be merged with the NRF node in a combined entity.

In some embodiments, the first SCP node 10 and the first NF node 20 may be deployed in independent deployment units, the first SCP node 10 and the second NF node 30 may be deployed in independent deployment units, and/or the first SCP node 10 and the third NF node 70 may be deployed in independent deployment units. Thus, an SCP node based on independent deployment units is possible, as described in 3GPP TS 23.501 V16.4.0. In other embodiments, the first SCP node 10 may be deployed as a distributed network element. For example, in some embodiments, part (e.g. a service agent) of the first SCP node 10 may be deployed in the same deployment unit as the first NF node 20, part (e.g. a service agent) of the first SCP node 10 may be deployed in the same deployment unit as the second NF node 30, and/or part (e.g. a service agent) of the first SCP node 10 may be deployed in the same deployment unit as the third NF node 70. Thus, an SCP node based on service mesh is possible, as described in 3GPP TS 23.501 V16.4.0.

In some embodiments, at least one second SCP node may be configured to operate as an SCP between the first NF node 20 and the first SCP node 10, at least one third SCP node may be configured to operate as an SCP between the first SCP node 10 and the second NF node 30, and/or at least one fourth SCP node is configured to operate as an SCP between the first SCP node 10 and the third NF node 70. Thus, a multipath of SCP nodes is possible. In some of these embodiments, the first SCP node 10 and one or more of the at least one at least one second SCP node, the at least one third SCP node, and the at least one fourth SCP node are deployed in independent deployment units. In some embodiments, the at least one second SCP node and/or the at least one third SCP node may be deployed as distributed network elements.

Steps 600-608 of FIG. 7 are as described earlier with reference to FIG. 2. However, at block 606 of FIG. 7, the first SCP node 10 may identify that the first request 602, 604 (for the second NF node 30 to use a resource to provide a first service requested by the first NF node 20) cannot be fulfilled. There can be various reasons that mean that the first request 602, 604 cannot be fulfilled. For example, the first request 602, 604 cannot be fulfilled if the first request 602, 604 transmitted towards the second NF node 30 is unsuccessful, no response is received from the second NF node 30 to the first request 602, 604 transmitted towards the second NF node 30 (as illustrated), or transmission of the first request 602, 604 towards the second NF node 30 is prevented.

Figure 1:
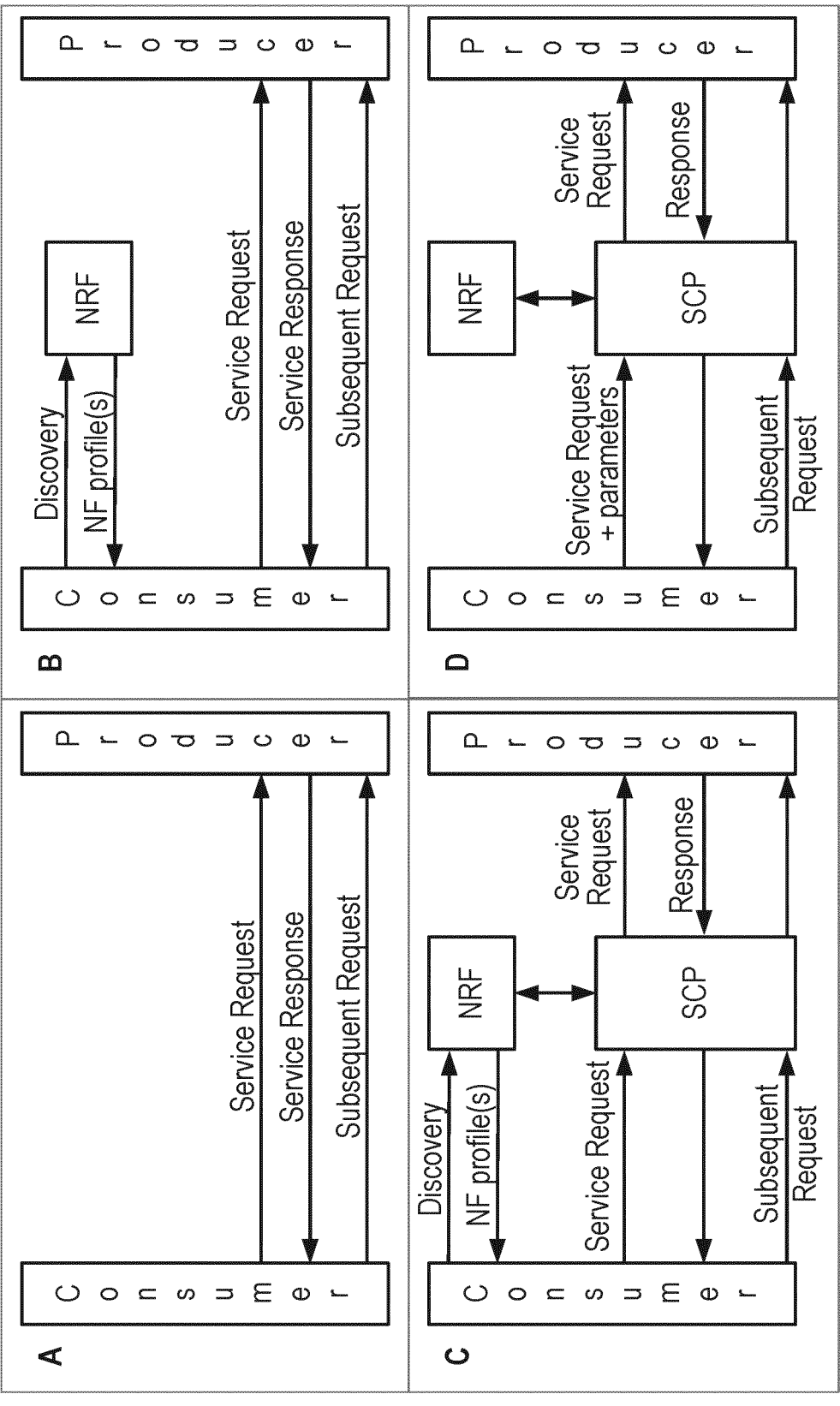
FIG. 1A-D is a block diagram illustrating different existing systems.
Figure 2:
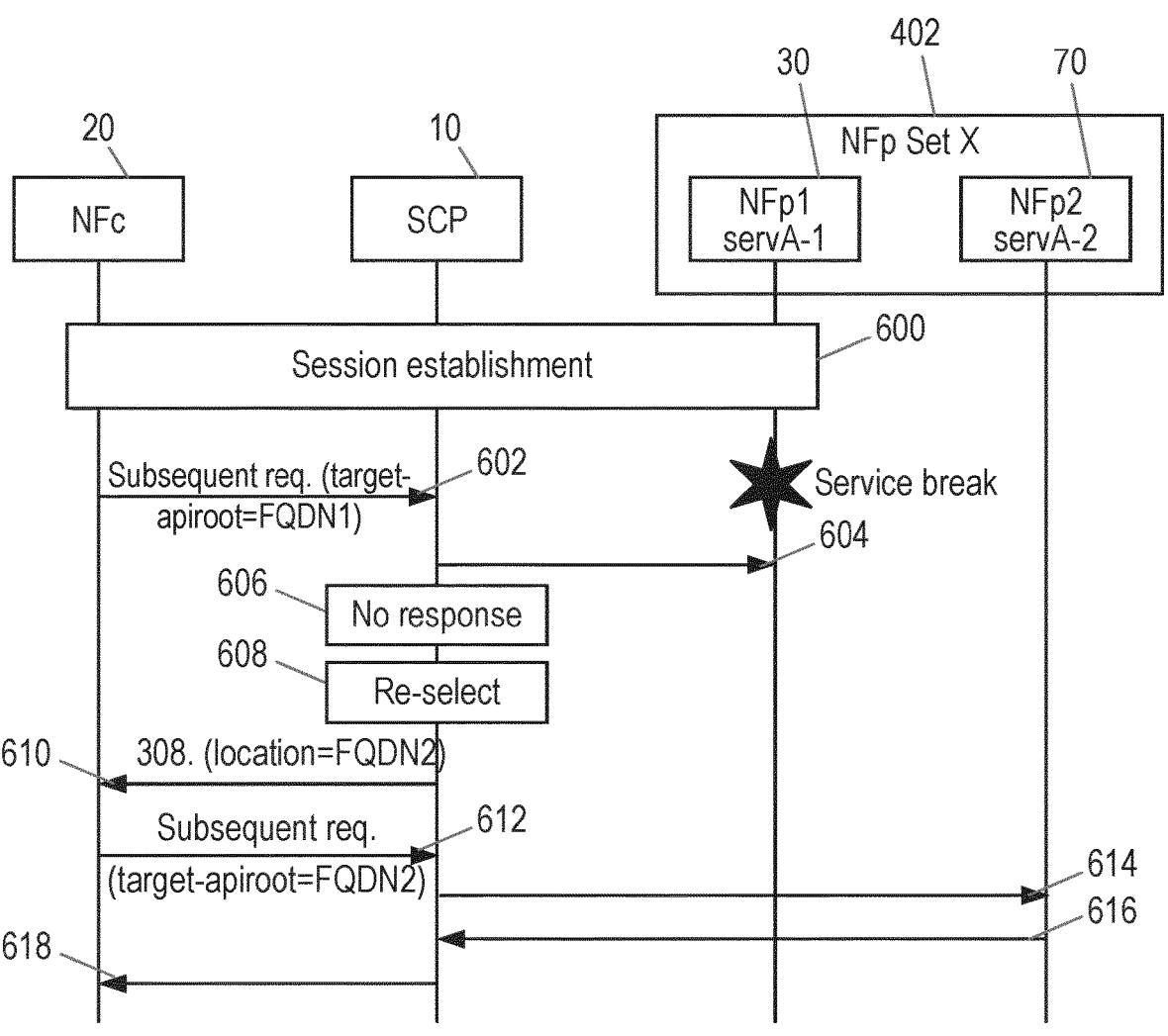
FIG. 2 is a signalling diagram illustrating an exchange of signals in an existing system.

Unlike the existing system illustrated in FIG. 2, in the system illustrated in FIG. 7, there is no extra round trip required. That is, in the system illustrated in FIG. 7, the first SCP node 10 does not need to respond to the first request 602, 604 by initiating transmission of a redirect message to the first NF node 20, which instructs the first NF node 20 to initiate transmission of a new request. Instead, in the system illustrated in FIG. 7, the first SCP node 10 informs the first NF node 20 about the selection (or reselection) that is performed at block 608 of FIG. 7.

In more detail, as illustrated by arrow 614 of FIG. 7, if the first request 602, 604 cannot be fulfilled (as at block 606 of FIG. 7), the first SCP node 10 initiates transmission of a second request towards a third NF node 30, 70 of the service producer. The transmission of this second request 614 is thus initiated towards the third NF node 30, 70 without the first SCP node 10 having responded to the first request 602, 604, i.e. prior to the first SCP node 10 responding to the first request 602, 604. The third NF node 30, 70 is the NF node of the service producer that the first SCP node 10 selects to provide the first service. The selection may be performed, for example, at block 608 of FIG. 7. The second request 614 is for the third NF node 30, 70 to use the resource to provide the first service requested by the first NF node 20.

In some embodiments, the third NF node 30 and second NF node 30 can be the same NF node. Thus, for example, the first SCP node 10 may retry the second NF node 30 according to some embodiments. In other embodiments, the third NF node 70 and the second NF node 30 can be different NF nodes. Thus, for example, the first SCP node

10 may try a different NF node according to other embodiments. In some embodiments where the third NF node 70 and the second NF node 30 are different NF nodes, a set 402 of NF nodes may comprise the second NF node 30 and the third NF node 70, as described earlier.

Returning to FIG. 7, as illustrated by arrow 616, the first SCP node 10 receives a response to the second request 614 indicative that the second request 614 is successful. In some embodiments, initiating transmission of the second request 614 towards the third NF node 30, 70 may be performed multiple times in respect of at least one third NF node 30, 70 until receipt of the response indicative that the second request 614 is successful. The at least one third NF node 30, 70 can be a single third NF node or a plurality of different third NF nodes. Thus, for example, the first SCP node 10 may retry the same NF node and/or try a different NF nodes multiple times until it receives a response indicative that the second request 614 is successful. In these embodiments, the information may be indicative of the location of the resource in the third NF node 30, 70 in respect of which the second request 614 is successful. If the second request 614 resulted in the resource being created in the third NF node 30, 70, the response may be a hypertext transfer protocol (HTTP) 201 "Created" response. In this case, the information comprised in the response to the second request 614 is indicative of the location of the created resource.

As illustrated by arrow 700 of FIG. 7, in response to receiving the response 616 to the second request 614 indicative that the second request 614 is successful, the first SCP node 10 initiates transmission of a response to the first request 602, 604 towards the first NF node 20. The response 700 to the first request 602, 604 comprises information indicative of a location of the resource in the third NF node 30, 70 to be used when a second service is subsequently requested by the first NF node 20.

In some embodiments, the first service and the second service may be different instances of the same service. In some embodiments, the different instances of the same service may be of the same type of service. In some embodiments, a set of services may comprise the first service and the second service, i.e. the first service and second service can be part of a "Service Set". In some embodiments, the set of services may be within the same NF node, i.e. the services can be part of an "NF Service Set". A set of services can be a group of interchangeable services. In some embodiments, the services of a set of services may have access to the same data (e.g. the same context data).

Although not illustrated in FIG. 7, in some embodiments, the method may comprise the first SCP node 10 generating the response 700 to the first request 602, 604. In some embodiments, generating the response 700 to the first request 602, 604 may comprise replacing information present in the first request 602, 604 that is indicative of a location of the resource in the second NF node 30 with the information indicative of a location of the resource in the third NF node 30, 70.

As illustrated by arrow 700 of FIG. 7, the first NF node 20 receives the response to the first request 602, 604. In some embodiments, the method may comprise the first NF node 20 controlling a memory (e.g. a memory 14 of the first NF node 20 or another memory) to store the information indicative of a location of the resource in a third NF node 30, 70 in place of previously stored information indicative of a location of the resource in the second NF node 30. As the response 700 comprises information indicative of a location of the resource in a third NF node 30, 70 to be used when a second service is subsequently requested by the first NF node 20, the first NF node 20 can direct subsequent requests for the second service accordingly.

In some embodiments, the information indicative of a location of the resource in a third NF node 30, 70 can comprise any one or more of an address of the third NF node 30, 70, a name of the service producer, a version of an application programming interface (API) for the service producer, an identifier that (e.g. uniquely) identifies the resource, and an address of the resource. The address of the third NF node 30, 70 may, for example, be an internet protocol (IP) address or an application programming interface (API) root of a uniform resource identifier (URI) used to reach of the third NF node 70 (i.e. the sbi-target-apiroot). In some embodiments, the information indicative of a location of the resource in a third NF node 30, 70 may be a uniform resource identifier (URI) of the resource, which may also be referred to in the art as the "resource URI". The URI may uniquely identify the resource.

In some embodiments, the information indicative of a location of the resource in a third NF node 30, 70 can be in the form of a unique string. In some embodiments, a header of the response 700 to the first request 602, 604 may comprise the information. In some embodiments, the header may be a hypertext transfer protocol (HTTP) or HTTP/2 header. The header can be a custom header. For example, the custom header may be called "3gpp-Sbi-Target-Location". An example of the custom header comprising the information indicative of a location of the resource in a third NF node 30, 70 may be, as follows:

3gpp-Sbi-Target-Location="3gpp-Sbi-Target-Location" ":" "OWS"
{apiRoot}/{apiName}/{apiVersion}/{apiSpecificResourceUriPart}

Here, OWS represents optional white spaces. The example custom header thus comprises an address of the newly selected third NF node 30, 70 ("apiRoot"), a name of the service producer ("apiName"), a version of an API for the service producer ("apiVersion"), and an identifier that (e.g. uniquely) identifies the resource and/or an address of the resource ("apiSpecificResourceUriPart").

The general structure of this header is consistent with the resource URI structure set out in section 4.4.1 of 3GPP TS 29.501 V16.4.0. In TS 29.501 V16.4.0, "apiRoot" is defined as a concatenation of a scheme (e.g. "http" or "https"), a fixed string (e.g. "://"), an authority (e.g. host and optional port), an optional deployment-specific string (API prefix) that starts with a "/" character. Also, "apiName" is said to define the name of the API, and "apiVersion" is said to indicate the first field of the version of the API. It is also defined in 3GPP TS 29.501 V16.4.0 that, while "apiRoot", "apiName" and "apiVersion" together define the base URI of the API, each "apiSpecificResourceUriPart" defines a resource URI of the API relative to the base URI. In the present disclosure, the format of the URI for the resource may have the same format mentioned in TS 29.501 V16.4.0 but the "apiSpecificResourceUriPart" may contain an identifier (e.g. a context id) that (e.g. uniquely) identifies the resource.

An example will now be described where the second NF node 30 and the third NF node 30, 70 are session management function (SMF) nodes and the first service is a protocol data unit (PDU) session. In this example, the first SCP node 10 may initially generate a custom header comprising information indicative of a location of the resource in the second NF node 30, as follows:

{apiRoot2}/nsmf-pdusession/v1/sm-contexts/smContextRef1

This example custom header comprises an address of the second NF node 30 ("apiRoot2"), a name of the service producer ("nsmf-pdusession"), a version of an API for the service producer ("v1"), an address of the resource ("sm-contexts"), and an identifier that (e.g. uniquely) identifies the resource ("smContextRef1"). apiRoot2 may be received by the first SCP node 10 in a 3gpp-Sbi-Target-apiRoot header of the first request 602 and the rest of the information can be part of the URI sent to the first SCP node 10. The first SCP node 10 has its own apiRoot.

As described earlier, if the first request 602, 604 cannot be fulfilled (as at block 606 of FIG. 7) and the first SCP node 10 needs to perform a reselection (as at block 608 of FIG. 7), the first SCP node 10 initiates transmission of the second request 614 towards the third NF node 30, 70. In response to receiving a response 616 to the second request 614 indicative that the second request 614 is successful (i.e. a positive response), the first SCP node 10 may add the new target to the header. For example, if the positive response is from a third NF node 70 that is a different NF node to the second NF node 30, the first SCP node 10 may replace the address of the second NF node 30 in the generated header with the address of the third NF node 70. In this way, the header comprises information indicative of the location of the resource in the third NF node 70, rather than information indicative of the location of the resource in the second NF node 30. For example, if the address of the third NF node 70 is apiRoot3, the new 3gpp-Sbi-Target-Location header will then become:

{apiRoot3}/nsmf-pdusession/v1/sm-contexts/smContextRef1

The first SCP node 10 initiates transmission of a response comprising this new header (as at arrow 700 of FIG. 7) and the first NF node 20 receives this response. Thus, in this way, the first NF node 20 receives information indicative of a location of the resource in the third NF node 30, 70.

The first NF node 20 can use the information indicative of a location of the resource in the third NF node 30, 70 when a second service is subsequently requested by the first NF node 20. For example, the first NF node 20 can use the address of the third NF node 70 (e.g. apiRoot3) for subsequent service requests. In some embodiments, the first NF node 20 may use the information for all subsequent requests or at least all subsequent requests towards the same resource. In some embodiments, the information can be used to construct URIs for the subsequent requests towards the resource. In some embodiments, a subsequent request can be to modify the resource.

In an example, where the first NF node 20 is to modify the resource mentioned in the earlier example, the first NF node 20 may generate (or construct) the following URI:

{apiRoot3}/nsmf-pdusession/v1/sm-contexts/smContextRef1/modify

In some embodiments, when the first NF node 20 initiates transmission of a subsequent request towards the first SCP node 10, a request URI may contain the apiRoot of the first SCP node 10, and the apiRoot of the resource may be provided in a 3gpp-Sbi-Target-apiRoot custom header. When the first SCP node 10 receives the request, it may replace the apiRoot of the request URI with the apiRoot received in the 3gpp-Sbi-Target-apiRoot custom header. In this way, the first SCP node 10 does not need to store data for each UE/session.

Figure 8:
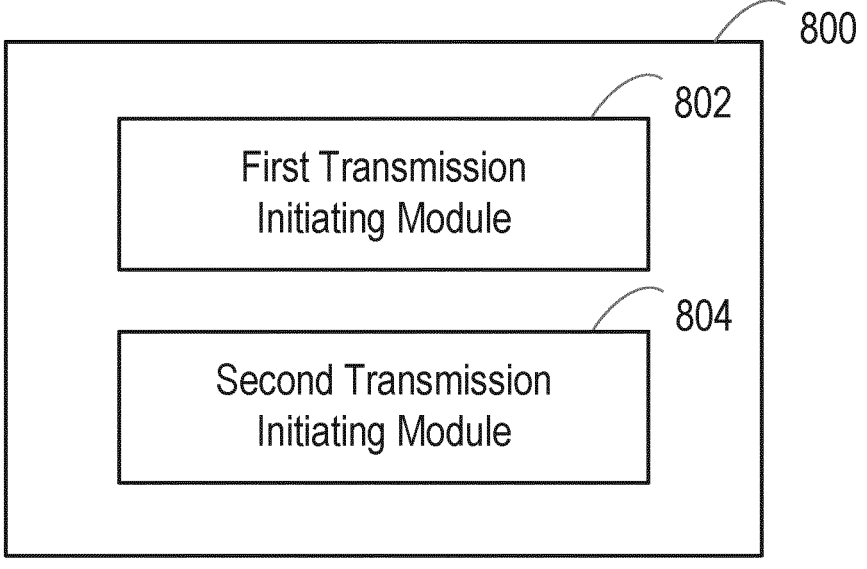
FIG. 8 is a block diagram illustrating a first SCP node according to an embodiment.

FIG. 8 is a block diagram illustrating a first SCP node 800 in accordance with an embodiment. The first SCP node 800 can handle a service request in a network. The first SCP node 800 can operate as an SCP between a first NF node of a service consumer and a second NF node of a service producer in the network. The first SCP node 800 can operate if a first request, for the second NF node to use a resource to provide a first service requested by the first NF node, cannot be fulfilled. The first SCP node 800 comprises a first transmission initiating module 802 configured to initiate transmission of a second request towards a third NF node of the service producer. The second request is for the third NF node to use the resource to provide the first service requested by the first NF node. The first SCP node 800 comprises a second transmission initiating module 804 configured to, in response to receiving a response to the second request indicative that the second request is successful, initiate transmission of a response to the first request towards the first NF node. The response to the first request comprises information indicative of a location of the resource in the third NF node to be used when a second service is subsequently requested by the first NF node. The first SCP node 800 may operate in the manner described herein in respect of the first SCP node.

Figure 9:
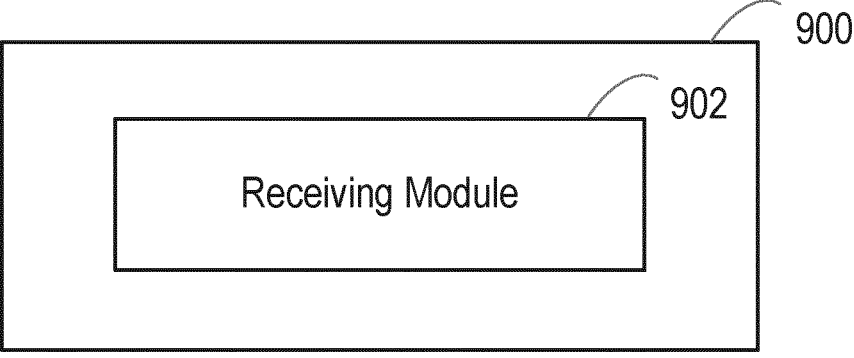
FIG. 9 is a block diagram illustrating a first NF node according to an embodiment.

FIG. 9 is a block diagram illustrating a first NF node 900 of a service consumer in accordance with an embodiment. The first NF node 900 can handle a service request in a network. A first NF node can operate as an SCP between the first NF node and a second NF node of a service producer in the network. The first NF node 900 comprises a receiving module 902 configured to receive a response to a first request. The first request is for the second NF node to use a resource to provide a first service requested by the first NF node. The response comprises information indicative of a location of the resource in a third NF node to be used when a second service is subsequently requested by the first NF node. The first NF node 900 may operate in the manner described herein in respect of the first NF node.

There is also provided a computer program comprising instructions which, when executed by processing circuitry (such as the processing circuitry 12 of the first SCP node 10 described earlier and/or the processing circuitry 22 of the first NF node 20 described earlier), cause the processing circuitry to perform at least part of the method described herein. There is provided a computer program product, embodied on a non-transitory machine-readable medium, comprising instructions which are executable by processing circuitry (such as the processing circuitry 12 of the first SCP node 10 described earlier and/or the processing circuitry 22 of the first NF node 20 described earlier) to cause the processing circuitry to perform at least part of the method described herein. There is provided a computer program product comprising a carrier containing instructions for causing processing circuitry (such as the processing circuitry 12 of the first SCP node 10 described earlier and/or the processing circuitry 22 of the first NF node 20 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the first SCP node functionality and/or the first NF node functionality described herein can be performed by hardware. Thus, in some embodiments, any one or more of the first SCP node 10 and the first NF node 20 described herein can be a hardware node. However, it will also be understood that optionally at least part or all of the first SCP node functionality and/or the first NF node functionality described herein can be virtualized. For example, the functions performed by any one or more of the first SCP node 10 and the first NF node 20 described herein can be implemented in software running on generic hardware that is configured to orchestrate the node functionality. Thus, in some embodiments, any one or more of the first SCP node 10 and the first NF node 20 described herein can be a virtual node. In some embodiments, at least part or all of the first SCP node functionality and/or the first NF node functionality described herein may be performed in a network enabled cloud. The first SCP node functionality and/or the first NF node functionality described herein may all be at the same location or at least some of the node functionality may be distributed.

It will be understood that at least some or all of the method steps described herein can be automated in some embodiments. That is, in some embodiments, at least some or all of the method steps described herein can be performed automatically.

Thus, in the manner described herein, there is advantageously provided improved techniques for handling service requests in a network. In particular, the first SCP node 10 does need not to store information for each UE/session on reselection, since the first NF node 20 is provided with information indicative of a location of the resource in a particular NF node of the service producer to be used for subsequent service requests.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for handling a service request in a 3GPP network, wherein the method is performed by a first service communication proxy (SCP) node that is configured to operate as an SCP between a first network function (NF) node of a service consumer and a second NF node of a service producer in the network, the method comprising:

if a first request, for the second NF node to use a resource to provide a first service requested by the first NF node, cannot be fulfilled:

initiating transmission of a second request towards a third NF node of the service producer, wherein the second request is for the third NF node to use the resource to provide the first service requested by the first NF node; and in response to receiving a response to the second request indicative that the second request is successful, initiating transmission of a response to the first request towards the first NF node, wherein the response to the first request comprises information indicative of a location of the resource in the third NF node to be used when a second service is subsequently requested by the first NF node.

2. The method as claimed in claim 1, wherein the information comprises any one or more of:

an address of the third NF node;

a name of the service producer; and a version of an application programming interface (API) for the service producer.

3. The method as claimed in claim 1, wherein the information is a uniform resource identifier (URI).

4. The method as claimed in claim 1, wherein a header of the response to the first request comprises the information.

5. The method as claimed in claim 4, wherein the header is a hypertext transfer protocol (HTTP) or HTTP/2 header.

6. The method as claimed in claim 1, wherein:

initiating transmission of the second request towards the third NF node is performed multiple times in respect of at least one third NF node until receipt of the response indicative that the second request is successful; and the information is indicative of the location of the resource in the third NF node in respect of which the second request is successful.

7. The method as claimed in claim 1, the method comprising:

generating the response to the first request, wherein generating the response to the first request comprises replacing information present in the first request that is indicative of a location of the resource in the second NF node with the information indicative of a location of the resource in the third NF node.

8. The method as claimed in claim 1, wherein:

the first SCP node and the first NF node are deployed in independent deployment units;

the first SCP node and the second NF node are deployed in independent deployment units; and/or the first SCP node and the third NF node are deployed in independent deployment units.

9. The method as claimed in claim 1, wherein the first SCP node is deployed as a distributed network element, wherein:

part of the first SCP node is deployed in the same deployment unit as the first NF node;

part of the first SCP node is deployed in the same deployment unit as the second NF node; and/or part of the first SCP node is deployed in the same deployment unit as the third NF node.

10. A first service communication proxy (SCP) node for handling a service request in a 3GPP network, wherein the first SCP node is configured to operate as an SCP between a first network function (NF) node of a service consumer and a second NF node of a service producer in the network, the first SCP node comprising:

processing circuitry configured to, if a first request, for the second NF node to use a resource to provide a first service requested by the first NF node, cannot be fulfilled:

initiate transmission of a second request towards a third NF node of the service producer, wherein the second request is for the third NF node to use the resource to provide the first service requested by the first NF node; and in response to receiving a response to the second request indicative that the second request is successful, initiate transmission of a response to the first request towards the first NF node, wherein the response to the first request comprises information indicative of a location of the resource in the third NF node to be used when a second service is subsequently requested by the first NF node.

11. A method for handling a service request in a 3GPP network, wherein the method is performed by a first network function (NF) node of a service consumer and wherein a first service communication proxy (SCP) node is configured to operate as an SCP between the first NF node and a second NF node of a service producer in the network, the method comprising:

receiving a response to a first request, wherein the first request is for the second NF node to use a resource to provide a first service requested by the first NF node, and wherein the response comprises information indicative of a location of the resource in a third NF node to be used when a second service is subsequently requested by the first NF node.

12. The method as claimed in claim 11, the method comprising controlling a memory to store the information indicative of a location of the resource in a third NF node in place of previously stored information indicative of a location of the resource in the second NF node.

13. The method as claimed in claim 11, wherein the information comprises any one or more of:

an address of the third NF node;

a name of the service producer;

a version of an application programming interface, API, for the service producer;

an identifier that identifies the resource; and an address of the resource.

14. The method as claimed in claim 11, wherein the information is a uniform resource identifier (URI).

15. The method as claimed in claim 11, wherein a header of the response to the first request comprises the information.

16. The method as claimed in claim 15, wherein the header is a hypertext transfer protocol (HTTP) or HTTP/2 header.

17. The method as claimed in claim 11, wherein the first service and the second service are different instances of the same service.

18. The method as claimed in claim 11, wherein:

the first SCP node and the first NF node are deployed in independent deployment units;

the first SCP node and the second NF node are deployed in independent deployment units; and/or the first SCP node and the third NF node are deployed in independent deployment units.

19. The method as claimed in claim 11, wherein the first SCP node is deployed as a distributed network element, wherein:

part of the first SCP node is deployed in the same deployment unit as the first NF node;

part of the first SCP node is deployed in the same deployment unit as the second NF node; and/or part of the first SCP node is deployed in the same deployment unit as the third NF node.

20. A first network function (NF) node of a service consumer, wherein the first NF node is configured to handle a service request in a 3GPP network, and wherein a first service communication proxy (SCP) node is configured to operate as an SCP between the first NF node and a second NF node of a service producer in the network, the first NF node comprising:

processing circuitry configured to receive a response to a first request, wherein the first request is for the second NF node to use a resource to provide a first service requested by the first NF node, and wherein the response comprises information indicative of a location of the resource in a third NF node to be used when a second service is subsequently requested by the first NF node.

21. The method as claimed in claim 1, wherein the information comprises any one or more of:

an identifier that identifies the resource; and an address of the resource.

* * * * *